United States Patent
Lu

(10) Patent No.: US 11,852,416 B2
(45) Date of Patent: Dec. 26, 2023

(54) CARBON FIBER, CARBON COMPOSITE AND FURNACE PURIFICATION BY HYDROGEN REDUCTION FOLLOWED BY THERMAL HEAT TREATMENT

(71) Applicant: GOODRICH CORPORATION, Charlotte, NC (US)

(72) Inventor: Weiming Lu, Akron, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/411,929

(22) Filed: Aug. 25, 2021

(65) Prior Publication Data

US 2021/0381769 A1    Dec. 9, 2021

Related U.S. Application Data

(62) Division of application No. 15/936,025, filed on Mar. 26, 2018, now Pat. No. 11,131,503.

(51) Int. Cl.
*F27D 7/06* (2006.01)
*F27D 19/00* (2006.01)
(Continued)

(52) U.S. Cl.
CPC .............. *F27D 7/06* (2013.01); *C04B 35/64* (2013.01); *C04B 35/83* (2013.01); *F16D 65/126* (2013.01); *F27D 19/00* (2013.01); *C04B 2235/614* (2013.01); *C04B 2235/652* (2013.01); *C04B 2235/656* (2013.01); *C04B 2235/658* (2013.01); *C04B 2235/6567* (2013.01); *C04B 2235/6581* (2013.01); *C04B 2235/6582* (2013.01); *C04B 2235/661* (2013.01); *C04B 2235/664* (2013.01);
(Continued)

(58) Field of Classification Search
CPC .................................. F27D 7/06; C04B 35/64
See application file for complete search history.

(56) References Cited

U.S. PATENT DOCUMENTS

| 1,286,088 A | 11/1918 | Pfanstiehl |
| 5,354,698 A | 10/1994 | Cathey, Jr. |

(Continued)

FOREIGN PATENT DOCUMENTS

EP    3109221    12/2016

OTHER PUBLICATIONS

European Patent Office, European Search Report dated Sep. 30, 2019 in Application No. 19165173.6.

(Continued)

*Primary Examiner* — Nicholas R Krasnow
(74) *Attorney, Agent, or Firm* — SNELL & WILMER L.L.P.

(57) ABSTRACT

A method of manufacture for a carbon/carbon part including a method to remove contamination from an intermediate product of the carbon/carbon part and furnace utilizing a gaseous reducing agent hydrogen gas to reduce the contaminates, thereby causing the contaminates to transition to a gaseous state at relatively lower temperatures. A method to remove contamination from an intermediate product of the carbon/carbon part and furnace utilizing hydrogen gas to reduce the contaminates, thereby causing the contaminates to transition to a gaseous state at relatively lower temperatures.

11 Claims, 4 Drawing Sheets

(51) Int. Cl.
*C04B 35/64* (2006.01)
*F16D 65/12* (2006.01)
*C04B 35/83* (2006.01)
*F27D 21/00* (2006.01)

(52) U.S. Cl.
CPC .... *C04B 2235/72* (2013.01); *C04B 2235/725* (2013.01); *C04B 2235/728* (2013.01); *C04B 2235/77* (2013.01); *F16D 2200/0052* (2013.01); *F16D 2250/0023* (2013.01); *F27D 21/0014* (2013.01); *F27D 2007/063* (2013.01); *F27D 2019/0003* (2013.01); *F27D 2019/0031* (2013.01)

(56) References Cited

U.S. PATENT DOCUMENTS

| | | | |
|---|---|---|---|
| 5,821,158 A | 10/1998 | Shishiguchi | |
| 6,455,160 B1 * | 9/2002 | Hiraoka | C04B 35/522 423/447.2 |
| 6,494,959 B1 | 12/2002 | Samoilov et al. | |
| 6,869,583 B2 | 3/2005 | Harutyunyan et al. | |
| 6,949,727 B2 | 9/2005 | Park | |
| 7,052,643 B2 * | 5/2006 | Sion | C04B 35/83 423/447.2 |
| 7,361,233 B2 | 4/2008 | Budinger et al. | |
| 7,410,630 B2 * | 8/2008 | Loncle | C04B 35/83 423/447.8 |
| 9,353,816 B2 | 5/2016 | La Forest | |
| 2003/0031620 A1 | 2/2003 | Harutyunyan | |
| 2005/0079359 A1 * | 4/2005 | Fujita | C30B 35/00 428/408 |
| 2011/0083305 A1 * | 4/2011 | La Forest | F16D 69/023 28/112 |
| 2011/0139346 A1 * | 6/2011 | Jouin | F16D 65/12 427/228 |
| 2016/0376203 A1 | 12/2016 | Rudolph et al. | |
| 2020/0068663 A1 | 2/2020 | Okamoto et al. | |

OTHER PUBLICATIONS

European Patent Office, European Partial Search Report dated Jun. 25, 2019 in Application No. 19165173.6.
USPTO, Restriction/Election Requirement dated Jun. 30, 2020 in U.S. Appl. No. 15/936,025.
USPTO, Non-Final Office Action dated Nov. 25, 2020 in U.S. Appl. No. 15/936,025.
USPTO, Notice of Allowance dated May 27, 2021 in U.S. Appl. No. 15/936,025.
European Patent Office, European Office Action dated Sep. 15, 2021 in Application No. 19165173.6.

* cited by examiner

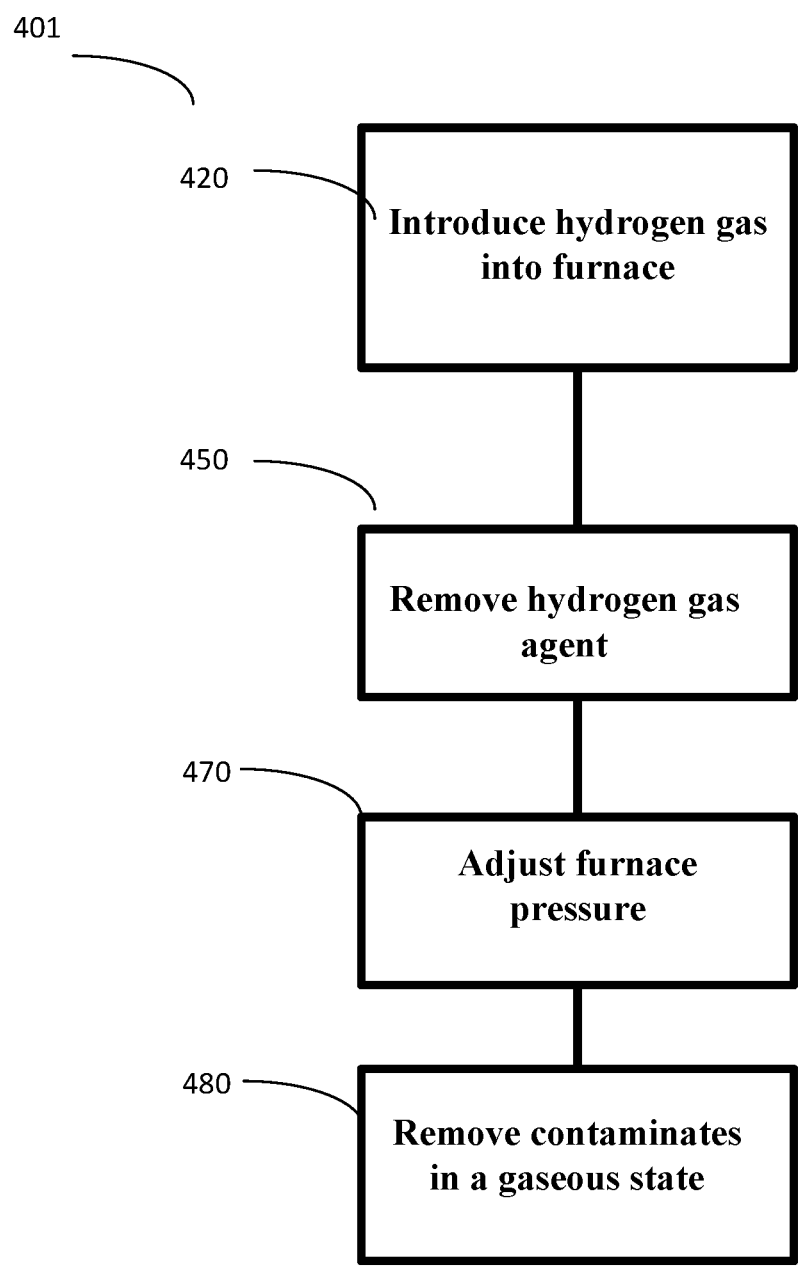

CARBON FIBER, CARBON COMPOSITE AND FURNACE PURIFICATION BY HYDROGEN REDUCTION FOLLOWED BY THERMAL HEAT TREATMENT

CROSS-REFERENCE TO RELATED APPLICATIONS

This application is a divisional of, and claims priority to, and the benefit of, U.S. application Ser. No. 15/936,025, filed Mar. 26, 2018 and entitled "CARBON FIBER, CARBON COMPOSITE AND FURNACE PURIFICATION BY HYDROGEN REDUCTION FOLLOWED BY THERMAL HEAT TREATMENT," which is incorporated by reference herein in its entirety for all purposes.

FIELD

This disclosure relates to the manufacture of carbon brake.

BACKGROUND

Carbon fiber reinforced carbon matrix composite (C/C composite) is often used in high performance braking systems, including braking systems for aircraft. Contamination, especially metallic contamination can negatively affect the composite's chemical and structural properties, which in turn may negatively impact brake performance. The contamination could come from carbon fiber precursors, the fiber preform needling process, CVI deposit or pitch/resin infiltration processing, and/or furnace heat treatment, as well as other processes. Constructing a clean C/C composite is a challenge in Carbon brake manufacturing.

SUMMARY

In various embodiments, a method of manufacturing a carbon/carbon brake disk may comprise: forming a carbon fiber preform, placing the carbon fiber preform within a furnace, purifying the preform with a gaseous reducing agent, carbonizing the preform, and densifying the preform. In various embodiments, reducing the contamination the preform with a gaseous reducing agent may comprise: introducing the gaseous agent into the furnace at a first temperature, bringing the furnace to a second temperature causing the gaseous agent to react with and reduce a contaminate, and removing the gaseous reducing agent by one of a first pressure differential and a first purging gas flow. According to various embodiments the gaseous reducing agent may be a hydrogen gas. In various embodiments the furnace may be at a first pressure when the hydrogen gas is introduced. In various embodiments, reducing the contamination on the preform may further comprise bringing the furnace to a third temperature; adjusting the furnace to a third pressure, wherein the contaminate transitions into a gaseous state; and creating one of a second pressure differential and a second purging gas flow to remove the second group of contaminates. In various embodiments, the first pressure may be between 200 Pa and 800 Pa. In various embodiments, the furnace may be held at the second temperature for a reduction time.

In various embodiments, a method of removing contamination from at least one of a furnace and an intermediate product of the carbon/carbon part within the furnace may comprise introducing a gaseous reducing agent into a furnace containing the carbon fiber preform at a first temperature; bringing the furnace to a second temperature, causing the gaseous reducing agent to react with and reduce a contaminate; and removing the gaseous reducing agent from the furnace. The gaseous reducing agent may be removed by creating a first pressure differential, or by using a first purging gas flow. In various embodiments, the furnace may be at a first pressure when the gaseous reducing agent is introduced.

According to various embodiments, a method of removing contamination from at least one of a furnace and an intermediate product of the carbon/carbon part within the furnace may additionally comprise bringing the furnace to a third temperature, wherein the contaminate may transition into a gaseous state; and removing the second group of contaminates. The second group of contaminates may be removed by creating a second pressure differential within the furnace, or by a second purging gas flow.

In various embodiments, the first temperature may be between 0° C. and 40° C. In various embodiments the second temperature may be greater than the first temperature. In various embodiments the second temperature may be between 500° C. and 900° C. In various embodiments the third temperature may be between 1700° C. and 2400° C.

In various embodiments, a method of removing contamination from at least one of a furnace, a carbon fiber preform within the furnace, and a carbon composite in the furnace may comprise introducing hydrogen gas into a furnace, allowing the hydrogen gas to react with and reduce a contaminate; and removing the hydrogen gas from the furnace. The hydrogen gas may be removed by creating a first pressure differential, or a first purging gas flow. According to various embodiments the furnace may be at a first pressure when the hydrogen gas is introduced. In various embodiments, the method may further comprise adjusting the furnace to a third pressure, wherein the contaminate may be converted into a gaseous state; and removing the second group of contaminates. The second group of contaminates may be removed by creating a second pressure differential within the furnace, or by a second purging gas flow.

According to various embodiments the method of removing contamination from at least one of a furnace, a carbon fiber preform within the furnace, and a carbon composite in the furnace may further comprise removing reactive gases from the furnace with a pre-reduction purging gas flow before the hydrogen gas is introduced. According to various embodiments the contaminate comprises at least one of sodium, potassium, calcium, iron, nickel, titanium and silicon. In various embodiments, the first pressure is between 200 Pa and 800 Pa.

BRIEF DESCRIPTION OF THE DRAWINGS

The subject matter of the present disclosure is particularly pointed out and distinctly claimed in the concluding portion of the specification. A more complete understanding of the present disclosure, may best be obtained by referring to the detailed description and claims when considered in connection with the figures. Within the figures, like numerals denote like elements.

FIG. 4. illustrates a method of purification using hydrogen gas, in accordance with various embodiments.

DETAILED DESCRIPTION

All ranges and ratio limits disclosed herein may include their upper and lower limits and may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying figures, which illustrate exemplary embodiments as examples, and are not limiting on the methods described herein. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the included teachings. Therefore, the detailed description disclosed herein is for purposes of illustration only and not limitation. The steps recited in any of the method or process descriptions may be executed in any order and are not necessarily limited to the order presented or the exemplary process in which the steps appear in this disclosure. That is, steps recited in any of the method or process descriptions may be applied to and/or removed from any of the exemplary methods or processes described herein. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 2:
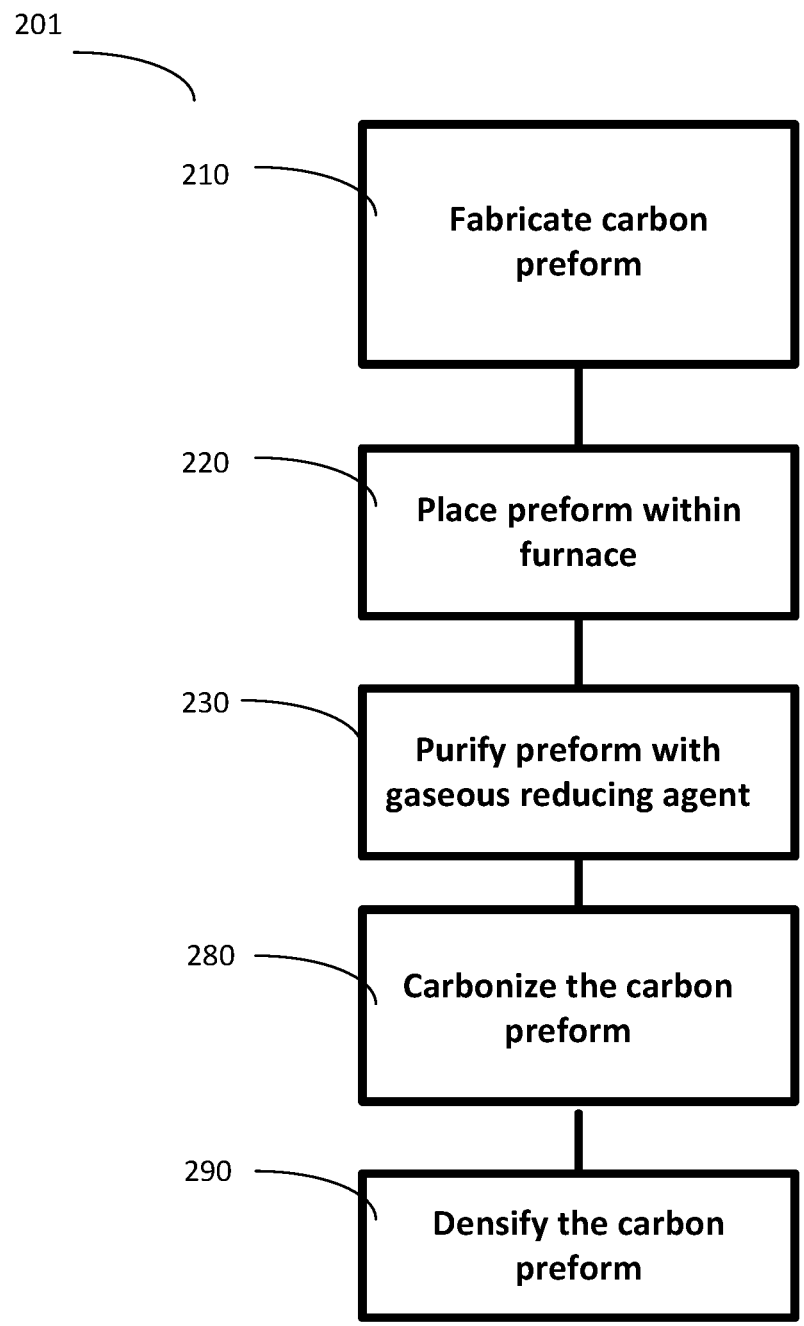
FIG. 2. illustrates a method of manufacturing a carbon/carbon brake disk, in accordance with various embodiments.

With reference to FIG. 2, a method of manufacturing a carbon/carbon brake disk, 201, is disclosed herein. Carbon/carbon parts ("C/C") in the form of friction disks (also referred to as a carbon/carbon brake disks) are commonly used for aircraft brake disks, race car brakes, and clutch disks. Carbon/carbon brake disks are especially useful in these applications because of the superior high temperature characteristics of C/C material. In particular, the carbon/carbon material used in C/C parts is a good conductor of heat and is able to dissipate heat generated during braking away from the braking surfaces. Carbon/carbon material is also highly resistant to heat damage, and thus, is capable of sustaining friction between brake surfaces during severe braking without a significant reduction in the friction coefficient or mechanical failure. Furthermore, carbon/carbon brake disks are useful because they are relatively light weight, in particular in comparison to previous steel brakes.

One method of manufacturing C/C materials involves fabricating a carbon fiber preform from an oxidized polyacrylonitrile (PAN) fiber (also referred to as "OPF") or carbon fiber, followed by carbonization, chemical vapor infiltration (CVI) densification and composite heat treatment. As used herein, a fiber preform is porous, and the terms preform, fibrous preform, and porous structure may be used interchangeably. The CVI/CVD process cycles are continued, in conjunction with machining the preform between infiltration cycles if desired, until the desired part density is achieved. In various embodiments, machining the surfaces of the preform may open surface porosity, thereby facilitating weight increases (i.e., density increases) in the preform during subsequent densification steps. Herein, "an intermediate product of the carbon/carbon part" may be one of carbon fiber preforms (carbon preforms), porous structures, fibrous preforms, carbonized preforms, or composite structures (carbon composites).

In general, C/C parts produced using the OPF, carbonization, CVI/CVD densification and composite heat treatment method are made in four successive manufacturing steps. First, a carbon fiber preform (also referred to herein as a carbon preform) is fabricated, step 210, utilizing a variety of textile manufacturing techniques. Typically, the carbon preform is made from OPF or carbon fiber. Although numerous techniques are known in the art for making carbon preforms from OPF, a common technique involves stacking layers of OPF to superimpose the layers. The added layers may then be needled perpendicularly to the layers with barbed textile needles. The needling process generates a series of z-fibers through the fiber preform that extend perpendicularly to the fibrous layers. The z-fibers are generated through the action of the needles pushing fibers from within the layer (x-y or in-plane) and reorienting them in the z-direction (through-thickness). Needling of the fiber preform may be done as one or more layers are added to the stack or may be done after the entire stack is formed. The needles may also penetrate through only a portion of the fiber preform or may penetrate through the entire fiber preform. In addition, resins are sometimes added to the fiber preform by either injecting the resin into the fiber preform following construction or coating the fibers or layers prior to forming the fiber preform. Fiber preforms may also be made from pitch based fiber tows and/or from rayon fiber tows.

The carbon fiber preform may then be placed within a furnace in step 210 for further processing. This may include purification of the carbon preform, step 230, and may additionally comprise purification of the vessel or furnace that is has been placed in.

Figure 1:
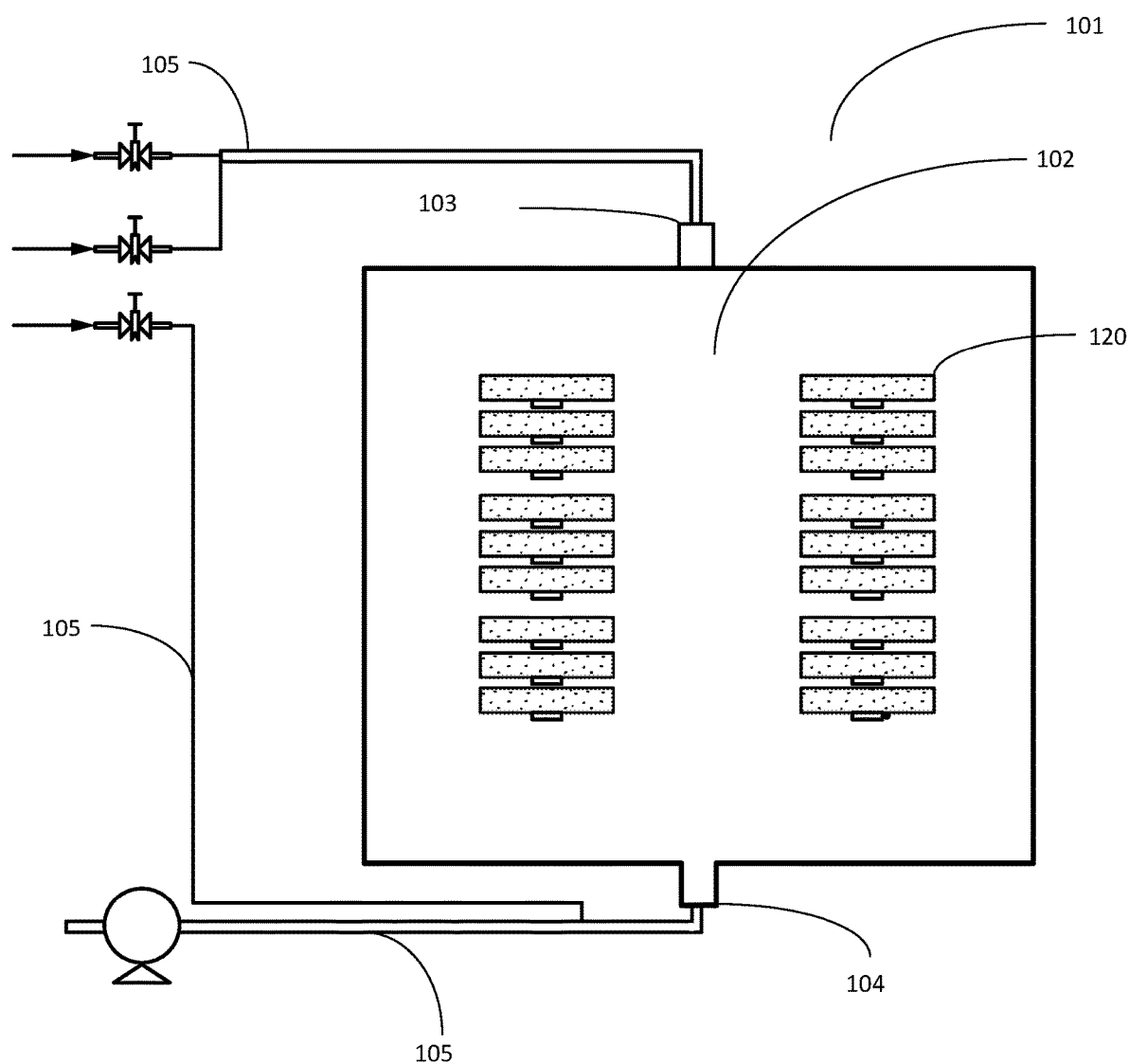
FIG. 1. illustrates a cross sectional view of a furnace used in the carbonization process of preforms, in accordance with various embodiments.

With brief reference to FIG. 1, in various embodiments the furnace 101 may undergo a pre-reduction purging gas flow to remove reactive gases, such as oxygen, from the furnace. The pre-reduction purging gas flow may be done using an inert gas such as argon, helium, krypton, neon, or xenon, or a gas with low reactivity such as nitrogen gas ($N_2$).

Next a gaseous reducing agent can be introduced to the interior 102 of the furnace 101. The amount of the gaseous reducing agent introduced may be proportional to the amount of contaminates that are to be removed. The gaseous reducing agent may be hydrogen gas ($H_2$). At this point, the furnace 101 will be a first temperature between 0° C. and 40° C. (32° F.-104° F.), 10° C. and 30° C. (50° F.-86° F.) or 15° C. and 25° C. (59° F.-77° F.). The pressure within the furnace 101 can be at a first pressure between 0.5 kPa-31 kPa (4 torr-240 torr), or 2 kPa and 8 kPa (15.5 torr-60 torr). Next, the interior 102 of the furnace 101 can be brought to a second temperature. This second temperature may be between 500° C. and 900° C. (932° F.-1652° F.), 550° C. and 850° C. (1022° F.-1562° F.), or 600° C. and 800° C. (1112° F.-1472° F.). As the temperature is raised from the first temperature to the second temperature, the furnace is sealed. As a result, the pressure will increase from the first pressure at the first temperature to a second pressure at the second temperature. This second pressure may be between 13 kPa and 400 kPa (100 torr-3,000 torr), or 46 kPa and 100 kPa (350 torr-750 torr). The second pressure will force the gaseous reducing agent into the fibrous preform and into the walls of the furnace. This allows the gaseous reducing agent to come into contact with a greater amount of contaminates.

The introduction of the gaseous reducing agent at these temperatures and pressures will cause the reduction of the contaminates on the preform 120 from an ionic compound or state to the elemental form (i.e., oxidation state of 0). The gaseous reducing agent can be left within the furnace 101 at the second temperature and the first pressure for a reduction time, to allow the reduction reactions to occur. A first group of contaminates may be reduced, and a second group of contaminates may be reduced at the first pressure and second temperature over the course of a reduction time. Depending on the amount of contaminates, gaseous reducing agent added, the temperature used, and the pressure used, the reduction time may be between five minutes and six hours, 10 minutes and four hours, or 15 minutes and two hours.

Once the contaminates are reduced through a chemical reaction from an oxidized to elemental form, they will sublimate or vaporize at a lower temperature and/or higher pressure. A first group of the contaminates may sublimate at the second temperature and first pressure. The remaining gaseous reacting agent can be removed, or substantially removed, from the furnace 101, by creating a first pressure differential, or using a first purging gas flow. (In this specific context "substantially removed" means that the majority of the gaseous reducing agent is removed.) In some circumstances, this may be done through an exhaust valve, 104. The first purging gas flow may be created by flowing an inert gas such as argon, helium, krypton, neon, or xenon, or a gas with low reactivity such as nitrogen gas ($N_2$) into and out of the furnace. At the second temperature, some of the contaminates may have sublimated or vaporized. These contaminates may also be removed along with the hydrogen gas by creating a first pressure differential.

The furnace 101 may be heated to a third temperature. This third temperature may be between 1700° C. and 2400° C. (3092° F.-4352° F.), 1800° C. and 2300° C. (3272° F.-4172° F.), or 1900° C. and 2200° C. (3452° F.-3992° F.). The third temperature may instead be set to slightly above the vaporization temperature for a particular contaminate. The pressure within the furnace 101 can also be decreased to a third pressure, step 370. In some embodiments, this third pressure may be between 0.5 Pa and 15.0 Pa+/- 0.3 Pa. In step 380, at these temperatures and pressures, the remaining reduced contaminates will continue to sublimate, and be removed from the furnace 101 through a continuous second pressure differential or second purging gas flow. In various embodiments the second pressure differential may not be continuous, but rather may be created after the heating has occurred. In various embodiments the second purging gas flow may not be continuous, but rather it may be initiated after the heating has occurred.

After the carbon preform is purified, it is carbonized, step 280 to convert the OPF into carbon fibers in a process referred to herein as carbonization/graphitization. Typically, preforms are carbonized by placing the preforms in a furnace with an inert atmosphere. As used herein, the phrase "furnace" may include any suitable furnace, vessel, tank, chamber, and/or the like. During carbonization/graphitization, the heat of the furnace causes a chemical conversion which drives off the non-carbon materials from the preform. Carbonization/graphitization may be conducted in a vacuum or partial vacuum (e.g., at pressures of 1-15 torr) (133 Pa to 1,999 Pa) or in an inert atmosphere at a temperature in the range from about 1,400° C. to about 2,800° C. (2,552° F. to about 5,072° F.), and in various embodiments in the range from about 1,400° C. to about 2,500° C. (2,552° F. to about 4,532° F.), and in various embodiments in the range from about 1,400° C. to about 2,200° C. (2,552° F. to about 3,992° F.) (wherein the term about in this context only means+/- 100° C.) for a period of time in the range of up to about 60 hours, and in various embodiments, in the range up to about 10 hours (wherein the term about in this context only means+/-2 hours). The resulting carbonized preform generally has the same fibrous structure as the carbon preform before carbonizing. However, the OPF have been converted to over 90% carbon or very near 100%, for example from 90% carbon to 99.9% carbon. The resulting carbonized preform may be referred to as having a fibrous network. In various embodiments, the preform may comprise any geometry.

After the fiber preform has been carbonized, the preform is densified in step 290. The preform may be referred to as a "porous structure" before and during densification. In general, densification involves filling the voids, or pores, of the porous structure with additional carbon material. This may be done using the same furnace used for carbonization or a different furnace. Typically, chemical vapor infiltration and deposition ("CVI/CVD") techniques are used to densify the porous structures with a carbon matrix. This commonly involves heating the furnace and the preforms, and flowing a reactant gas comprising, for example, hydrocarbon gases (e.g., at least one of methane, ethane, propane, cyclopentane, hydrogen, nitrogen, helium, argon, an alkane, and/or the like, as described herein) into the furnace and around and through the preforms. The hydrocarbons may comprise alkanes, for example, straight chain, branched chain and/or cyclic alkanes, having from 1 to about 8 carbon atoms, and in various embodiments from 1 to about 6 carbon atoms, and in various embodiments from 1 to about 3 carbon atoms. Methane, ethane, propane, cyclopentane, or mixtures of two or more thereof may be used. The reactant gas may comprise one or more alkanes of 2 to about 8 carbon atoms, and in various embodiments from 2 to about 6 carbon atoms. Mixtures of one or more alkanes of 1 to about 8 carbon atoms with one or more alkenes of 2 to about 8 carbon atoms may be used. In various embodiments, the CVI/CVD process may include a temperature gradient. In various embodiments, the CVI/CVD process may include a pressure differential. As used herein, CVI/CVD may refer to chemical vapor infiltration or chemical vapor deposition. Accordingly, CVI/CVD may refer to chemical vapor infiltration or deposition.

CVI/CVD densification may be conducted in a vacuum or partial vacuum (e.g., at pressures of 133 Pa to 1,999 Pa (1 torr-15 torr) or in an inert atmosphere at a temperature in the range from about 900° C. to about 1100° C. (1,652° F. to about 2012° F.), and in various embodiments in the range of up to about 1,000° C. (1,832° F.) (wherein the term about in this context only means+/- 100° C.) for a period of time in the range from about 150 hours to about 550 hours, and in various embodiments, in the range from about 300 hours to about 700 hours (wherein the term about in this context only means+/-24 hours). The number of hours used in a CVI/CVD process may be referred to as hours on gas ("HOG").

As a result, carbon decomposes or pyrolyzes from the hydrocarbon reactant gases and is deposited on and within the preforms. Typically, the densification process is continued until the preform reaches a density in the range from 1.6 to 1.9 grams per cubic centimeter (g/cc), and in various embodiments, a density of approximately 1.75 g/cc. When the densification step is completed, the resulting C/C part has a carbon fiber structure with a carbon matrix infiltrating the fiber structure, thereby deriving the name "carbon/carbon."

The term "composite structure" may refer to a densified porous structure. The composite structure may comprise a porous structure with a solid residue or matrix dispersed within. The composite structure may comprise a carbonaceous porous structures with a carbonaceous matrix dispersed within. This may be referred to as a carbon/carbon composite. The composite structure may comprise a ceramic porous structure with a ceramic or oxide matrix dispersed within. The composite structure may comprise a mixed or hybrid composite structure such as a carbon porous structure with a ceramic or oxide matrix dispersed within, a carbon porous structure with a mix of carbon and ceramic or oxide matrix dispersed within, a ceramic porous structure with a carbon matrix dispersed within, a ceramic porous structure with a mix of carbon and ceramic or oxide matrix dispersed within, and/or the like. In various embodiments, the composite structure may comprise carbon, silicon, silicon carbide, silicon nitride, boron, boron carbide, aluminum nitride, titanium nitride, cubic zirconia, and $SiC_xN_y$, where x is a number in the range from about zero to about 1, and y is a number in the range from about zero to about 4/3. The composite structure may comprise a first surface, a second surface and at least one other surface connecting the first surface and the second surface. In various embodiments, and as used herein, any surface may comprise any suitable shape, such as, for example, at least one of rounded, sphere shaped, toroid shaped, or frustoconical.

Disclosed herein are methods for removing contamination from carbon fiber preforms, composite structures, and various process vessels, including furnaces.

Contaminates may be introduced to carbon fiber preforms through the needling process described above, as metals may transfer from the needles to the fiber preforms. Moreover, the OPF may contain various metals that sublimate during carbonization. The sublimated or vaporized contaminates may be deposited on the furnace and/or its associated plumbing. These contaminates may include various metals such as sodium, potassium, iron, calcium, silicon, titanium, nickel, and/or their oxides, such as $Na_2O$, $K_2O$, $Fe_2O_3$, CaO, $SiO_2$, $TiO_2$, NiO or various combinations thereof, for example. Similarly, the carbon composite may be exposed to contaminates within the furnace, or when it is removed from the furnace to be machined during the densification process. With reference to FIG. 1 the furnace of a furnace 101, 201 can be subjected to contaminates introduced when a contaminated fiber preform 120 or composite structure 120 are placed within the furnace 101, for example. Portions of the contaminates may be deposited within the interior 102 of the furnace 101, at the same time as the preform or structures. Relatedly, when the furnace 101 is heated, some of the contaminates may have sublimated or vaporized but were not completely exhausted from the furnace 101.

Figure 3:
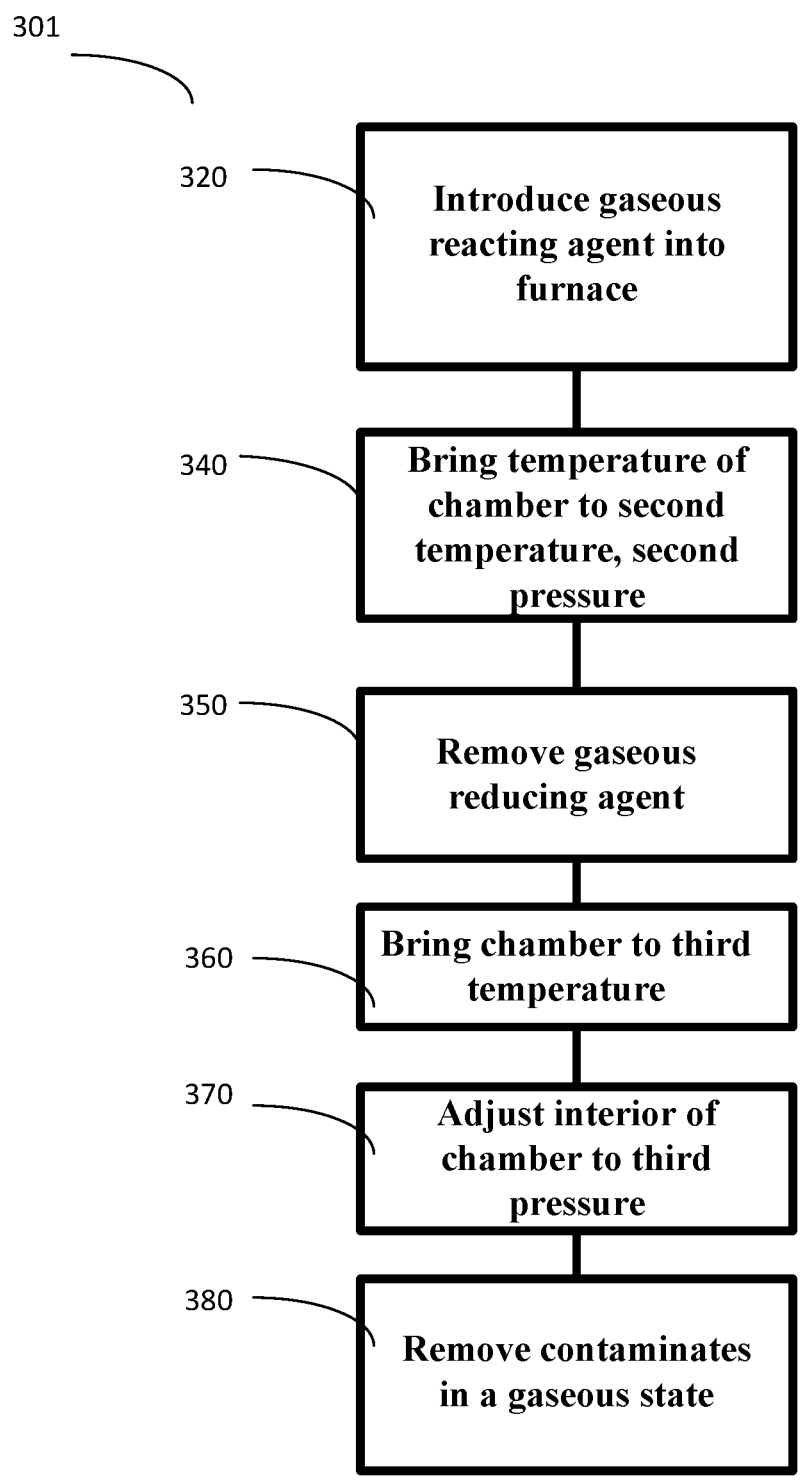
FIG. 3. illustrates a method of purification using a gaseous reducing agent, in accordance with various embodiments.

Referring to FIG. 3, the furnace can go through a purification process or method 301, to remove these contaminates. An intermediate product of the carbon/carbon part within the furnace may also be purified using a purification process.

Referring to FIG. 1 a furnace 101, an intake 103 and an exhaust 104. It may also comprise plumbing 105 associated with the operation of the furnace. The intermediate products of the C/C parts 120 may be placed within the furnace 102. For purposes of illustration, all the intermediate products of the C/C parts 120 may be one of carbon fiber preforms (carbon preforms), porous structures, fibrous preforms, carbonized preforms, or composite structures (carbon composites). Once an intermediate product of the carbon/carbon part is placed within the furnace 101, furnace 101 may be purged using an a pre-reduction purging gas flow, where a pre-reduction purging gas flow comprises introducing and removing an inert gas such as argon, helium, krypton, neon, or xenon, or a gas with low reactivity such as nitrogen gas ($N_2$). This can be used to remove a number of unwanted substances from the furnace 101, including oxygen gas ($O_2$).

A gaseous reducing agent (i.e., a reducing agent in a gaseous form), can then be introduced to the furnace 101, step 320. In various embodiments, this may be done at a first temperature, which may be between 0° C. and 40° C. (32° F.-104° F.), 10° C. and 30° C. (50° F.-86° F.) or 15° C. and 25° C. (59° F.-77° F.). The pressure within the furnace 101 can be a first pressure between 0.5 kPa-31 kPa (4 torr-240 torr), or 2 kPa and 8 kPa (15.5 torr-60 torr). The temperature within the furnace 101 can be adjusted to a second temperature, in step 340. This second temperature may be between 500° C. and 900° C. (932° F.-1652° F.), 550° C. and 850° C. (1022° F.-1562° F.), or 600° C. and 800° C. (1112° F.-1472° F.). As the temperature is raised from the first temperature to the second temperature, the furnace is sealed. As a result, the pressure will increase from the first pressure at the first temperature to a second pressure at the second temperature. This second pressure may be between 13 kPa and 400 kPa (100 torr-3,000 torr), or 46 kPa and 100 kPa (350 torr-750 torr). The second pressure will force the gaseous reducing agent into the fibrous preform and into the walls of the furnace. This allows the gaseous reducing agent to come into contact with a greater amount of contaminates.

The furnace 101 is then held at the second temperature for a reduction time while the contaminates on and/or within the carbon fiber preform 120 are reduced by the gaseous reducing agent. As the gaseous reducing agent is added, and the temperature increases from the first temperature to the second temperature, The pressure may rise inside the furnace; however, in various embodiments, the exhaust 104 may be open during the transition to the second temperature, in which case pressure in the furnace at the second temperature may equal the first pressure.

The length of the reduction time may be varied depending on amount of contaminates, the amount of gaseous reducing agent added, the temperature used, and the pressure used. The reduction time may be between five minutes and six hours, 10 minutes and four hours, or 15 minutes and two hours. In their elemental form (i.e., having an oxidation state of 0), the contaminates will be sublimated or vaporized at a lower temperature that they would in their ionic or oxidized forms.

A first group of contaminates may transition to a gaseous state at the first temperature and the third pressure, after undergoing reduction. As shown in step 350, the remaining gaseous reducing agent and the gaseous (e.g., sublimated or vaporized) contaminates that sublimated or vaporized at the first pressure and second temperature, if any, can be substantially removed from the furnace 101 using a first pressure differential, or a first purging gas flow. (In this specific context "substantially removed" means that the majority of the gaseous reducing agent and gaseous contaminates are removed.) The first purging gas flow may be created by flowing an inert gas such as argon, helium, krypton, neon, or xenon, or a gas with low reactivity such as nitrogen gas ($N_2$) into and out of the furnace.

Turning to step 360, the furnace 101 may be heated to a third temperature. This third temperature may be between 1700° C. and 2400° C. (3092° F.-4352° F.), 1800° C. and 2300° C. (3272° F.-4172° F.), or 1900° C. and 2200° C. (3452° F.-3992° F.). The third temperature may be set to slightly above the vaporization temperature for a particular contaminate. The pressure within the furnace 101 may also be decreased to a third pressure, step 370. This third pressure may be between 0.5 Pa and 15.0 Pa+/− 0.3 Pa. At these temperatures and pressures, the remaining reduced contaminates will continue to sublimate. Once sublimated, the contaminates may be and be removed from the furnace 101 through either a second pressure differential, or a second purging gas flow in 380. The second pressure differential may be continuous as the temperature increases from the second temperature to the third temperature. The second purging gas flow may be created by flowing an inert gas such as argon, helium, krypton, neon, or xenon, or a gas with low reactivity such as nitrogen gas ($N_2$) into and out of the furnace. The second purging gas flow may be separate from the pre-reduction gas flow, and the first purification gas flow may also be separate from the pre-reduction gas flow. The concentration of contaminates in and on the matrix of the carbon fiber preform 120 can be reduced to between 30 and 50 ppm.

With reference to FIG. 4, and continued reference to FIG. 1, contamination may be removed from the furnace 101, and optionally an intermediate product of the carbon/carbon part 120 within the furnace, through a method 401 using hydrogen gas, $H_2$ to reduce the contaminates. An intermediate product of the carbon/carbon part 120 may be placed within the furnace 101. The furnace 101 may be purged using an inert gas such as argon, helium, krypton, neon, or xenon, or a gas with low reactivity such as nitrogen gas ($N_2$). Next, hydrogen gas can be introduced into the furnace 101 at a first temperature. The first temperature may be between 0° C. and 40° C. (32° F.-104° F.), 10° C. and 30° C. (50° F.-86° F.) or 15° C. and 25° C. (59° F.-77° F.). The pressure of the furnace 101 may be a first pressure of between 0.5 kPa-31 kPa (4 torr-240 torr), or 2 kPa and 8 kPa (15.5 torr-60 torr). The temperature within the furnace can be raised to a second temperature between 500° C. and 900° C. (932° F.-1652° F.), 550° C. and 850° C. (1022° F.-1562° F.), or 600° C. and 800° C. (1112° F.-1472° F.). As the temperature is raised from the first temperature to the second temperature, the furnace is sealed. As a result, the pressure will increase from the first pressure at the first temperature to a second pressure at the second temperature. This second pressure may be between 13 kPa and 400 kPa (100 torr-3,000 torr), or 46 kPa and 100 kPa (350 torr-750 torr). The second pressure will force the gaseous reducing agent into the fibrous preform and into the walls of the furnace. This allows the gaseous reducing agent to come into contact with a greater amount of contaminates.

At this second temperature, the contaminates will undergo reduction for a reduction time.

The following are examples of such reduction reactions, given hydrogen gas as the gaseous reducing agent:

$$H_2 + Na_2O = H_2O + 2Na$$

$$H_2 + K_2O = H_2O + 2K$$

$$3H_2 + Fe_2O_3 = 3H_2O + 2Fe$$

Some contaminates, comprising a first group of contaminates, may sublimate at the first pressure and second temperature. The reduction time may be between five minutes and six hours, 10 minutes and four hours, or 15 minutes and two hours. After the furnace 101 has been maintained at the second temperature for a reduction time, the hydrogen gas and the first group of contaminates may also be substantially removed using a first pressure differential or a first purging gas flow, as shown in step 450. (In this specific context "substantially removed" means that the majority of the hydrogen gas and first group of contaminates are removed.)

The first purging gas flow may be created by flowing an inert gas such as argon, helium, krypton, neon, or xenon, or a gas with low reactivity such as nitrogen gas ($N_2$) into and out of the furnace.

Once the hydrogen is removed, the furnace 101 may be heated to a third temperature. The third temperature may be a temperature that is higher than the vaporization temperature of a targeted contaminate at a third pressure. The third temperature may be between 1700° C. and 2400° C. (3092° F.-4352° F.), 1800° C. and 2300° C. (3272° F.-4172° F.), or 1900° C. and 2200° C. (3452° F.-3992° F.). The furnace 101 can additionally be adjusted to the third pressure, step 470, which may be between about 0.5 Pa and 15.0 Pa+/− 0.3 Pa. The furnace 101 may then be vented by creating a second pressure differential, or a second purging gas flow, shown in step 480. As the furnace is vented, the second group of contaminates may be substantially removed from the furnace. (In this specific context "substantially removed" means that the majority the second group of contaminates is removed.) The second pressure differential or second purging gas flow may be continuous during steps 470 and 480. That is, there may not be a In various embodiments, the second pressure differential or second purging gas flow may not be created until after step 470. The second purging gas flow may be created by flowing an inert gas such as argon, helium, krypton, neon, or xenon, or a gas with low reactivity such as nitrogen gas ($N_2$) into and out of the furnace.

Implementing the various steps, techniques, combinations, etc. discussed herein, below are various examples of use of the purification methods with hydrogen gas disclosed herein.

Example 1

A sample of carbon fiber was measured for impurities, which were found to be 265 ppm.

The sample was subjected to a method as described herein. In particular, the carbon fiber was subjected to hydrogen gas and heated to 1900° C. After the process, the carbon fiber was measured to have impurities of 12 ppm. A second sample of carbon fiber was subjected to a method as described herein. In particular, the second sample of carbon fiber was subjected to hydrogen gas and heated to 2187° C. A scanning electron microscope (SEM) was used to view the carbon fiber at a resolution of nm level. The surface appeared undamaged. Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of removing contamination from at least one of a furnace and an intermediate product of a carbon/carbon part within the furnace comprising:
   introducing a gaseous reducing agent into the furnace at a first temperature;
   bringing the furnace to a second temperature to cause the gaseous reducing agent to reduce a contaminate, the second temperature being greater than the first temperature;
   substantially removing the gaseous reducing agent from the furnace by at least one of creating a first pressure differential and creating a first purging gas flow;
   bringing the furnace to a third temperature that is greater than the second temperature and decreasing a pressure within the furnace, after removing the gaseous reducing agent, to vaporize the contaminate; and
   removing the vaporized contaminate from the furnace by at least one of creating a second pressure differential or flowing a second purging gas through the furnace.

2. The method of claim 1, wherein the furnace is at a first pressure when the gaseous reducing agent is introduced, and wherein the furnace is at a second pressure when the furnace is at the second temperature.

3. The method of claim 2, wherein the first temperature is between 0° C. and 40° C.

4. The method of claim 3, wherein the second temperature is greater than the first temperature.

5. The method of claim 4, wherein the second temperature is between 500° C. and 900° C.

6. The method of claim 5, wherein the third temperature is between 1700° C. and 2400° C.

7. A method of removing contamination from at least one of a furnace and an intermediate product of a carbon/carbon part within the furnace comprising:
   introducing hydrogen gas into the furnace at a first temperature, allowing the hydrogen gas to reduce a contaminate in the carbon/carbon part;
   increasing the furnace to a second temperature that is greater than the first temperature;
   substantially removing the hydrogen gas from the furnace by at least one of creating a first pressure differential and creating a first purging gas flow;
   increasing the furnace to a third temperature that is greater than the second temperature after removing the hydrogen gas from the furnace and reducing a pressure in the furnace, wherein a contaminate transitions into a gaseous state; and
   creating at least one of a second pressure differential and a second purging gas flow to remove the contaminate.

8. The method of claim 7, wherein the furnace is at a first pressure when the hydrogen gas is introduced, and wherein the furnace is at a second pressure when the hydrogen gas is removed.

9. The method of claim 7, further comprising removing reactive gas from the furnace with a pre-reduction purging gas flow before the hydrogen gas is introduced.

10. The method of claim 9, wherein the contaminate comprises at least one of sodium, potassium, calcium, iron, nickel, titanium and silicon.

11. The method of claim 10, wherein the first pressure is between 0.5 kPa and 31 kPa.

* * * * *